United States Patent [19]
Watanabe et al.

[11] Patent Number: 5,617,378
[45] Date of Patent: Apr. 1, 1997

[54] MAGNETO-OPTICAL DISC SYSTEM HAVING AN OBJECTIVE LENS WITH A NUMERICAL APERTURE RELATED TO THE THICKNESS OF THE PROTECTIVE LAYER

[75] Inventors: Tetsu Watanabe; Yoshio Aoki, both of Tokyo, Japan

[73] Assignee: Sony Corporation, Tokyo, Japan

[21] Appl. No.: 499,347

[22] Filed: Jul. 7, 1995

Related U.S. Application Data

[63] Continuation-in-part of Ser. No. 383,351, Feb. 3, 1995.

[30] Foreign Application Priority Data

Jan. 31, 1990  [JP]  Japan ..................... 2-21210

[51] Int. Cl.⁶ ............................................. G11B 11/00
[52] U.S. Cl. ............................... 369/13; 369/275.5
[58] Field of Search ..................... 369/13, 14, 275.2, 369/283, 284, 286, 272, 275.5; 428/64.3, 694 ML

[56] References Cited

U.S. PATENT DOCUMENTS

| | | | |
|---|---|---|---|
| 4,807,204 | 2/1989 | Mizutani et al. | 369/13 |
| 5,276,674 | 1/1994 | Tanaka | 369/275.5 |
| 5,479,382 | 12/1995 | Nishida et al. | 369/13 |
| 5,481,530 | 1/1996 | Ueda et al. | 369/275.1 |

*Primary Examiner*—Tan Dinh
*Attorney, Agent, or Firm*—Jay H. Maioli

[57] ABSTRACT

An magneto-optical disc system includes an magneto-optical disc with a light-transmitting cover and an objective lens for bundling or focusing a laser beam on a recording layer of the magneto-optical disc in order to perform recording and/or reproduction. The thickness $t_2$ of the light-transmitting cover is set to fall within the range of 0.6 to 0.1 mm, the numerical aperture (NA) of the objective lens is set to fall within the range of 0.55 to 0.70 and the wavelength of the light beam is selected to be between 635 and 680 nanometers.

2 Claims, 4 Drawing Sheets

MAGNETO-OPTICAL DISC SYSTEM HAVING AN OBJECTIVE LENS WITH A NUMERICAL APERTURE RELATED TO THE THICKNESS OF THE PROTECTIVE LAYER

This is a continuation in part of application Ser. No. 08/383,351 filed Feb. 3, 1995.

BACKGROUND OF THE INVENTION

1. Field of the Invention

The present invention relates to a magneto-optical disc system for performing recording and/or reproduction of an information signal and to a magneto-optical disc used in such system.

2. Description of the Prior Art

A magneto-optical disc system utilizing a magneto-optical effect for performing recording in and/or reproduction from a magneto-optical disc is shown in FIG. 1. A magneto-optical disc system shown in FIG. 1 is arranged such that when a disc-like one-sided magneto-optical recording medium 50 is mounted, an optical system including a laser unit 58, an objective lens 59, and the like is arranged above the one-sided magneto-optical recording medium 50, and a magnetic field generation unit 60 serving as a magnetic system is arranged below the one-sided magneto-optical recording medium 50. A numerical aperture (to be referred to as NA hereinafter) of the objective lens 59 is set to fall within the range of 0.50 to 0.53.

In order to drive the optical system in focusing and tracking directions with respect to the magneto-optical recording medium 50, a drive system (not shown) is provided. Another drive system (not shown) is provided to drive the magnetic system in a radial direction on the recording medium 50 and in the tracking direction.

In this magneto-optical disc system, a magnetic field modulation scheme is employed to perform recording. In this magnetic field modulation scheme, high-speed reverse control of a magnetic field must be performed in accordance with an information signal to be recorded. For this reason, a sufficiently large excitation current cannot be obtained. The intensity of the magnetic field generated by the magnetic field generation unit is limited. The magnetic field generation unit 60 is located near a magnetic recording layer 53, to be described below, in the one-sided magneto-optical recording medium 50. An overwrite operation can be performed according to the magnetic field modulation scheme.

The one-sided magneto-optical recording medium 50 is formed as follows. A dielectric layer 52, a magnetic recording layer 53 having a large magneto-optical effect and made of, for example, a rare earth element-transition metal alloy amorphous thin film, a dielectric film 54, a reflecting layer 55, and a protective cover 56 are sequentially stacked on one surface of a light-transmitting transparent substrate 51 made of, for example, polycarbonate. The transparent substrate 51 has a predetermined thickness $t_1$. The thickness of a conventional substrate is set to be 1.2 mm.

An operation of this magneto-optical disc system will be described below.

The one-sided magneto-optical recording medium 50 is placed on and driven by a rotary table (not shown), and a magnetic field is applied from the magnetic field generation unit 60 to the magnetic recording layer 53 of the one-sided magneto-optical recording medium 50. High-speed reverse control of the magnetic field to be applied is performed on the basis of an information signal to be recorded. A laser beam emitted from the laser unit 58 is focused through the objective lens 59 on the magnetic recording layer 53 applied with this magnetic field. A change in direction of magnetization occurs in a region of the magnetic recording layer 53 irradiated with the focused laser beam in accordance with the direction of the magnetic field applied from the magnetic field generation unit 60. Therefore, an overwrite operation of an information signal can be performed in real time.

In order to obtain a more compact magneto-optical pickup, which is constituted by the optical system, the magnetic system, and the drive systems for driving the optical and magnetic systems, it is assumed that the optical system may be formed integrally with the magnetic system, with both systems being arranged on one side of the magneto-optical recording medium. More specifically, the magnetic field generation unit 60 of FIG. 1 is located on the same side as the objective lens 59, that is, on the side of the transparent substrate 51. Nevertheless, because a distance between the magnetic field generation unit 60 and the magnetic recording layer 53 then becomes larger than before, a sufficiently high magnetic field cannot be applied to the magnetic recording layer 53.

Along with an increase in information volume in recent years, a two-sided magneto-optical recording medium has been developed, in which the magnetic recording layers are formed respectively on both surfaces of one magneto-optical recording medium so as to be capable of recording information signal son each of the surfaces.

In order to perform recording in and/or reproduction from such a two-sided magneto-optical recording medium it is very difficult to apply a sufficiently high magnetic field to each of the magnetic recording layers by means of the magneto-optical pickup of FIG. 1, constituted by the optical and magnetic systems. The reason for this is that in the magnetic field generation unit using the magnetic field modulation scheme, a high-frequency current corresponding to a high-frequency data signal representing the information to be recorded must be supplied to an electromagnetic coil. In that situation, it tends to become more and more difficult for the current to flow through the electromagnetic coil as the frequency of the current increases, so that the strength of the generated magnetic field is limited. In addition, another reason is that the distance between the magnetic field generation unit and each magnetic recording layer is rather large. Therefore, in state-of-the-art techniques it is very difficult to perform two-side optomagnetic recording under the magnetic field modulation scheme.

In order to cope with an increase in information volume, more information signals must be recorded in the recording portion such as the magnetic recording layer of a magneto-optical disc.

OBJECTS AND SUMMARY OF THE INVENTION

It is, therefore, an object of the present invention to provide a large-capacity magneto-optical disc system capable of performing recording and/or reproducing in higher density and to provide a magneto-optical disc used in this magneto-optical disc system.

According to an aspect of the present invention, there is provided a magneto-optical disc system for recording an information signal in a one-sided magneto-optical disc and/or reproducing an information signal from the magneto-optical disc, the magneto-optical disc having a light transmitting substrate, a magneto-optical recording layer formed on the substrate and protective layer protecting the recording layer. A laser beam irradiates the recording layer through the substrate for recording or reproduction. In the case of a two-sided magneto-optical disc a substrate is provided with a recording layer on each side and a light-transmitting cover is formed to cover and magneto-optical recording layer and the laser beam is transmitted through the transparent cover layer. The magneto-optical recording system comprises a laser beam generating means for generating the laser beam, an objective lens for focusing the laser beam on the magneto-optical recording layer through the light-transmitting cover or through the transparent substrate, and a magnetic field applying means for applying a magnetic field to the magneto-optical layer, characterized in that the magneto-optical disc has a diameter of 88 mm, the thickness of the substrate or of the transparent cover layer is 0.8 mm, a numerical aperture of the objective lens is 0.55, and the wavelength of the laser light beam is 680 mm.

In addition, in this optical disc system the tracking servo is a sampled servo system. This means that the magneto-optical disc is already formed with a plurality of pits to be sampled in performing servo tracking control.

In the system using the magneto-optical disc of this invention, the numerical aperture NA of the objective lens for performing high-density recording or reproduction is 0.55, so that the thickness of the light-transmitting cover of the disc or of the substrate of the disc, formed to cover the recording layer and transmit the laser beam to the recording layer, is set to 0.8 mm.

When the laser beam is bundled or focused by the objective lens, the convergent rays have a minimum diameter ($2\omega_0$) represented by equation (1) below:

$$2\omega_0 = 0.82 \times \lambda/NA \tag{1}$$

($\lambda$: wavelength of the laser beam)

Since the numerical aperture NA of the objective lens is larger than a value falling within the conventional NA range of 0.50 to 0.53, the minimum diameter of the convergent rays is decreased, so that the recording density is increased. Therefore, reproduction corresponding to this high recording density can be performed.

As the NA is increased, the thickness of the objective lens is increased, but the thickness of the light-transmitting substrate or cover layer of the magneto-optical disc of this invention is smaller than the conventional thickness (1.2 mm), so that the objective lens having a larger thickness will not be brought into contact with the optical disc.

As the NA of the objective lens and the thickness $t$ of the light-transmitting substrate of the magneto-optical disc are changed, the aberration values of the objective lens are changed as follows.

(A) Spherical Aberration $W_{40}$ $$W_{40} = \frac{t}{8} \cdot \frac{N^2-1}{N^3} \sin^4\alpha \tag{2}$$

(sin $\alpha$ = NA)

($N$: refractive index of light—transmitting cover of the optical disc)

(B) Coma $W_{31}$ $$W_{31} = \frac{t}{2} \cdot \frac{(N^2-1)N^2\sin\theta\cos\theta}{(N^2-\sin^2\theta)^{5/2}} \sin^3\alpha \tag{3}$$

($\theta$: skew)

The spherical aberration (A) can be corrected by the objective lens and does not pose any decisive problem. If the thickness $t$ of the light-transmitting substrate is excessive, however, problems may be presented. Therefore, the thickness $t$ is preferably set to the value expressed above.

The coma (B) cannot be corrected by the objective lens. It is preferable to make the absolute value of the coma as small as possible. Even if the numerical aperture NA increases, the thickness $t$ of the light-transmitting cover layer or substrate is small, so that the absolute value of the coma $W_{31}$ does not become large.

Each aberration of the objective lens scarcely poses any problem even when the numerical aperture NA is increased. According to the optical disc system described above, recording and/or reproduction can thus be performed in higher density than that of a conventional system.

Thus, the magneto-optical recording media capable of performing high-density recording and reproduction can be realized. In the magneto-optical disc, if a high-permeability layer is formed between the substrate and the magneto-optical layer, vertical magnetic field efficiency is preferably increased.

The magneto-optical disc may have respective recording layers on both sides of the substrate. Such magneto-optical disc having the respective recording layers on both sides can be used in a magneto-optical disc system of this invention. In this system, a pair of optical pickup units, each of which has a laser beam generating means, an objective lens, and a magnetic field applying means, are arranged on opposite sides of a magneto-optical disc so as to face each other.

According no the magneto-optical disc having the recording layers on both of its surfaces, and the magneto-optical disc system capable of using this magneto-optical disc, higher-capacity recording and reproduction can be performed.

DETAILED DESCRIPTION OF PREFERRED EMBODIMENTS

First, second, and third embodiments of this invention will be described with reference to FIGS. 2 to 5.

Figure 1:
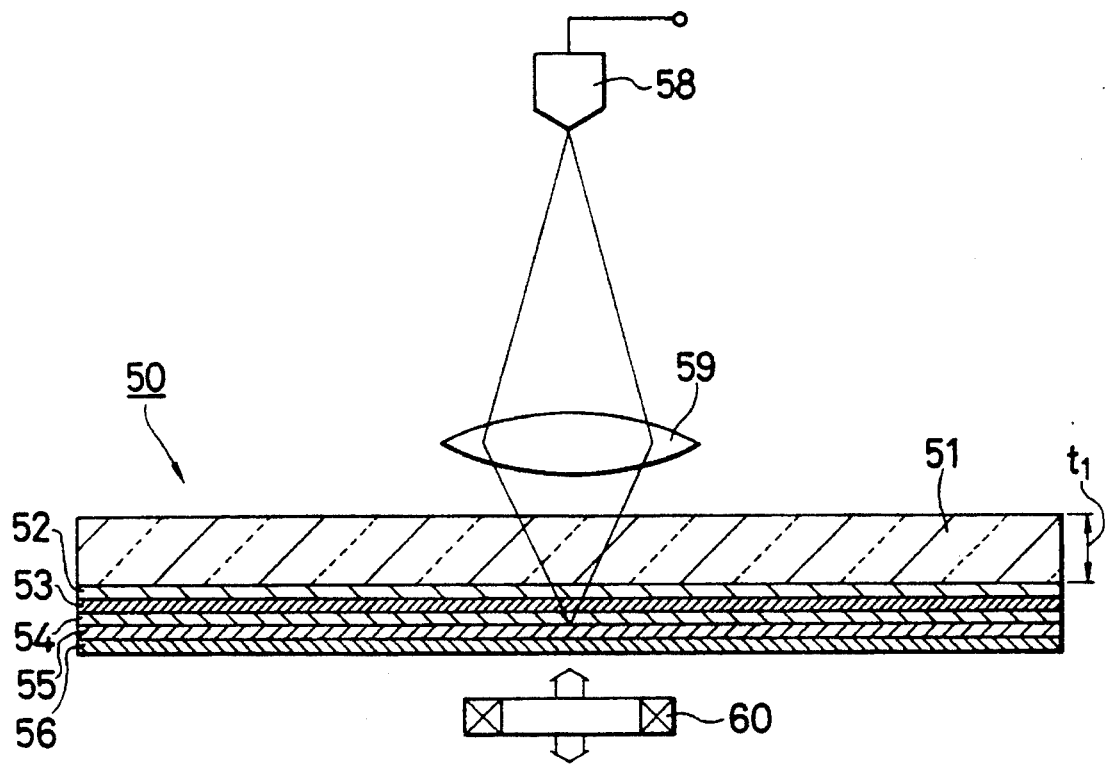
FIG. 1 is a sectional view showing a basic arrangement of a conventional magneto-optical disc system.
Figure 2:
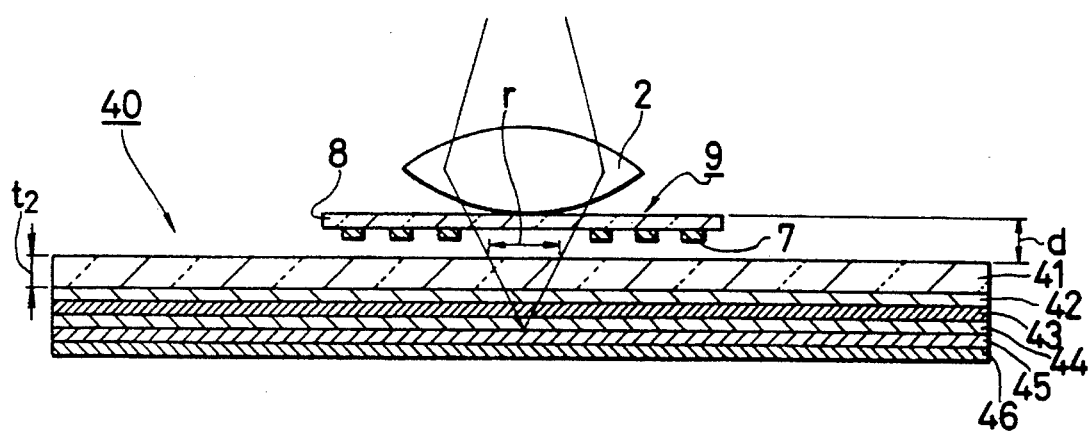
FIG. 2 is a sectional view showing an arrangement of an magneto-optical disc system according to a first embodiment of the present invention.

FIG. 2 is a sectional view showing the first embodiment of a magneto-optical disc system. As shown in FIG. 2, this magneto-optical disc system comprises an objective lens 2 having an NA of 0.55 and a magnetic field generating unit 9 constituted by a light-transmitting optical glass 8 having a coil pattern 7.

This magneto-optical disc system is arranged to perform recording and reproduction upon radiating a laser beam of the laser beam unit to a disc-like one-sided magneto-optical recording medium 40, which is obtained by sequentially stacking a dielectric layer 42, a magnetic recording layer 43, a dielectric layer 44, a reflecting film 45, and a protective cover 46 on a thin light-transmitting substrate 41 having a thickness $t_2$ of around 0.8 mm. The magnetic field generating unit 9 employs a magnetic field modulation scheme and applies a magnetic field to the magnetic recording layer 43. The magnetic field generating unit 9 is described below in detail with reference to FIG. 4.

The thickness of the dielectric layer 42 is much smaller than the thickness $t_2$, so that it can be neglected with respect to the thickness $t_2$.

The objective lens 2 serving as an optical system and the optical glass 8 serving as a magnetic system are bonded and fixed to a bobbin (not shown) to form an integrated structure. The coil pattern 7 is arranged close to the magneto-optical recording medium 40.

Since the thickness $t_2$ of the light-transmitting substrate 41 is much smaller than the thickness of the conventional substrate, and the coil pattern 7 is located near the light-transmitting substrate 41, a distance between the coil pattern 7 and the magnetic recording layer 43 is preferably made small. Since the optical system can be formed integrally with the magnetic system, a magneto-optical pickup unit constituted by these optical and magnetic systems can be made compact and not expensive. Recording in and reproduction from the double-sided magneto-optical recording media can be performed as will be described in the second and third embodiments.

In a magneto-optical recording medium used in this magneto-optical disc system, for example, a 88 mm magneto-optical disc can be used as a hard disc in a permanent installation or it can be housed in a cartridge holder for use as a replaceable disc.

When the NA of the objective lens 2 is increased to be 0.55, its focal depth ($=\lambda/NA^2$, $\lambda$: wavelength of laser beam) becomes small. Since the magneto-optical disc is made small as described above, an actuator (not shown) constituting a drive system for the magneto-optical pickup can be made small, and its frequency characteristics can be improved. As this actuator can properly perform tracking control of the magneto-optical pickup using a sampled servo system, it raises no problem that the focal depth is small.

More specifically, according to the present invention the magneto-optical disc is originally formed with a plurality of sampled pits. These samples pits are offset relative to the center of the recording tracks. These samples pits are used to detect a tracking error, and a tracking error signal is generated based on a detection signal from these pits. The track pitch is typically 1.2 microns.

The spherical aberration $W_{40}$ is corrected by the objective lens 2. As for the coma $W_{31}$, even if the NA of the objective lens is increased as described above, it raises no problem, because the thickness $t_2$ of the light-transmitting substrate is quite small.

Coma $W_{31}$ equivalent to the coma $W_{31}$ when the NA of the objective lens is 0.5 and the thickness $t$ of the light-transmitting substrate (light-transmitting cover) is 1.2 mm is obtained in the following case.

TABLE 1

| NA | 0.50 | 0.55 |
|---|---|---|
| λ (nm) | 780 | 680 |
| t (mm) | 1.2 | 0.786 |

As shown in Table 1, if the thickness $t$ is set to approximately 0.8 mm even when the NA range is 0.55, the coma can be suppressed to a level equal to or lower than that of the conventional case, so that no problem arises.

As the NA of the objective lens 2 is increased, the thickness of the objective lens 2 is increased. However, since the thickness $t_2$ of the transparent substrate or transparent protective layer is small, a distance $\underline{d}$ (working distance) between the objective lens 2 and the magneto-optical recording medium 40 increases more than previously possible, as shown in FIG. 2. Thus, the objective lens 2 is kept from coming into contact with the magneto-optical recording medium 40, and the optical glass 8 can be interposed between the objective lens 2 and the magneto-optical recording medium 40.

Dust is a perplexing problem to an optical system can be eliminated when a cartridge is employed to house the recording medium. The grain size and distribution of the dust are important factors to consider in the performance of the magneto-optical disc system. A radius $\underline{r}$, as shown in FIG. 2, of a circle formed when a laser beam is projected on the transparent substrate 41 is given as follows:

$$r = t \cdot \tan(\arc\sin)(NA/N) \quad (4)$$

As is apparent from equation (4), when the thickness $\underline{t}$ of the light-transmitting substrate is decreased, the radius $\underline{r}$ is also reduced. But the NA is large, so that the radius $\underline{r}$ need not be greatly decreased. Therefore, no dust problem is posed in this embodiment.

As described above, in the optical disc system of this embodiment the NA of the objective lens is set to 0.55 and, at the same time, the thickness $t_2$ of the light-transmitting substrate (light-transmitting cover) is set to 0.8 mm, so that the recording density can be increased $(0.55/0.50)^2$ times, or more than 1.2 times greater than that of the conventional system, in which an objective lens having an NA of 0.50 is used, as is apparent from equation (1). All the above-mentioned various problems caused by an increase of NA can thus be overcome. Therefore, a large storage capacity optical disc system can be obtained without posing any problem.

Detailed arrangements of the optical disc system given in the first embodiment will be further given in relation to the second and third embodiments.

Figure 3:
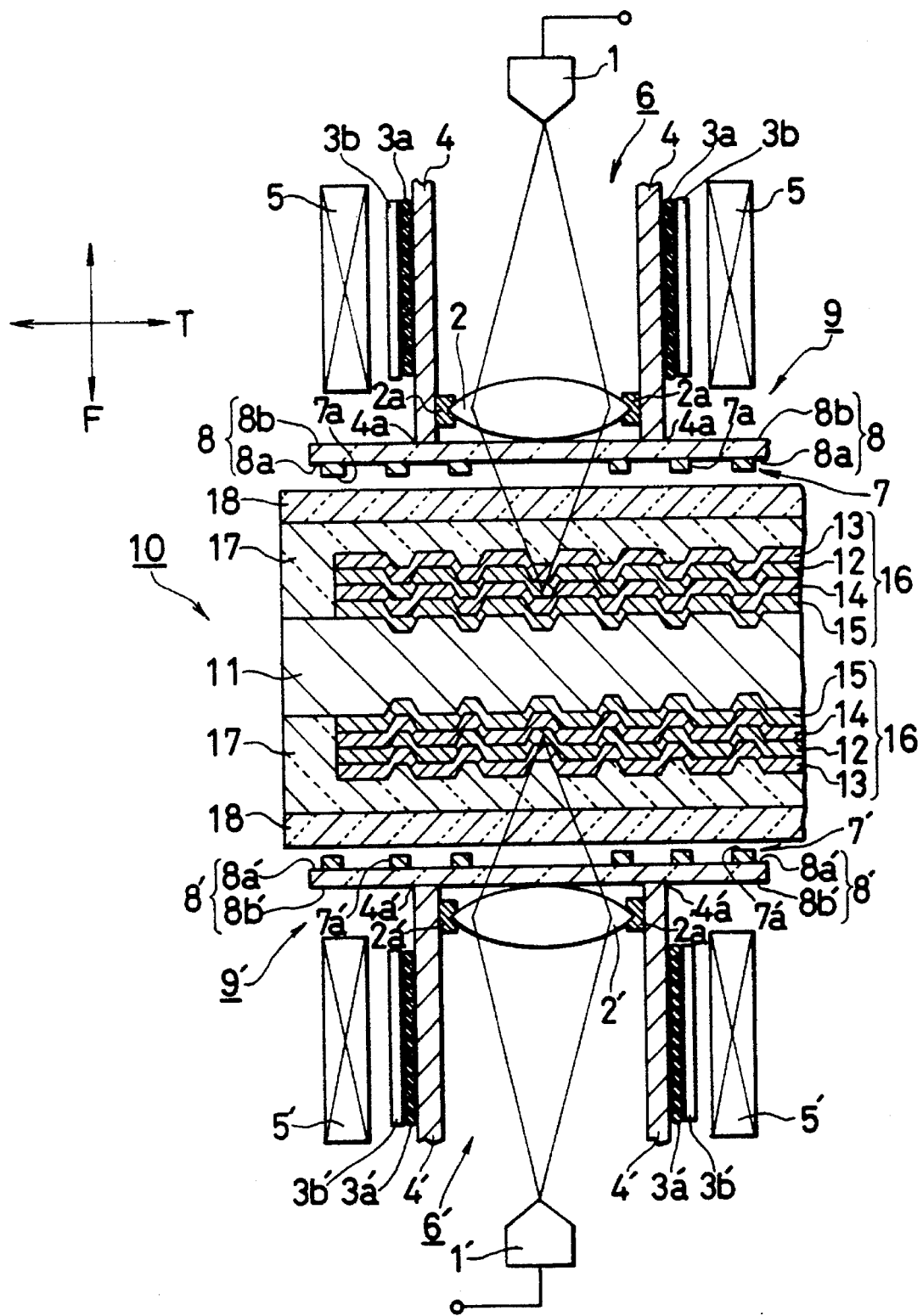
FIG. 3 is a sectional view showing an arrangement of a magneto-optical disc system according to a second embodiment of the present invention.

FIG. 3 is a sectional view of an optical disc system according to the second embodiment of the present invention.

In the second embodiment, first and second optical pickup units are arranged on opposite sides of an optical recording medium 10, so as to face each other as shown in FIG. 3.

The first magneto-optical pickup unit located above the magneto-optical recording medium 10 and the second magneto-optical pickup unit located below the magneto-optical recording medium 10 are substantially the same as described below, and thus, reference numerals 1 to correspond to reference numerals 1' to 9', respectively.

Figure 4:
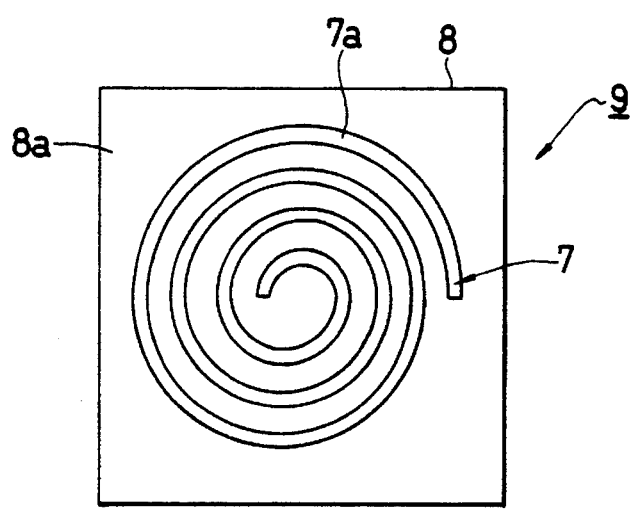
FIG. 4 is a front view of an optical glass having a coil pattern used in the magneto-optical disc systems of FIGS. 2 and 3 and in a magneto-optical disc system of FIG. 5.

As shown in FIG. 4, the magnetic field generating units 9 and 9' are formed such that conductors 7a and 7a' for generating magnetic fields upon receipt of currents of high-frequency signals are formed as spiral coil patterns 7 and 7' in upper surfaces 8a and 8a' of light-transmitting optical glasses 8 and 8' made of, for example, quartz. The objective lenses 2 and 2' are positioned on lower surfaces 8b and 8b' having no coil patterns 7 and 7' of the optical glasses 8 and 8', so that the centers of the objective lenses 2 and 2' are aligned with the centers of the coil patterns 7 and 7', respectively. The objective lenses 2 and 2' are fixed near the end portions 4a and 4a' of the coil bobbins 4 and 4' through the lens support members 2a and 2a', respectively. The optical glasses 8 and 8' are adhered to the end portions 4a and 4a' of the coil bobbins 4 and 4', respectively. Therefore, the laser beams can be focused on the centers of the generated magnetic fields, respectively. Thus, no centering process is needed during assembly of the pickups.

Quartz was used as a material for the optical glasses 8 and 8', but quartz can be replaced with other materials having suitable light-transmitting properties. As the coil patterns 7 and 7', printed coils, thin film coils, or the like may be used. Holes for transmitting laser beams from the laser units 1 and 1' may be formed in the optical glasses 8 and 8' to prevent the laser beams from being reflected by the surfaces of the optical glasses 8 and 8', respectively.

In the first two-sided magneto-optical recording medium 10 shown in FIG. 3 recording portions 16, photo-curable resin layers 17, and thin transparent protective cover layers or plates 18 are formed respectively on both surfaces of one substrate 11. Both the transparent protective plates 18 and the photo-curable resin layers 17 have light-transmitting properties. The thickness of each cover layer 18 is approximately 0.8 mm.

In each of the recording portions 16, the reflecting layer 15 is provided closer to the substrate 11 than a magnetic recording layer 12 and, further, the reflecting layer 15, a second dielectric layer 14, the recording layer 12, and a first dielectric layer 13 are stacked in turn from the side of the substrate 11.

In this double-sided magneto-optical recording medium 10, the substrate 11 is used in common, so that the thickness of the recording medium can be made substantially half as compared with that of a conventional double-sided optical recording medium, in which the two substrates are stuck together.

The operation of the magneto-optical disc system will be described below.

In the first magneto-optical pickup unit, when a current is supplied to the focus coil 3a, the coil bobbin 4 and the magnetic field generating unit 9 integrated with the coil bobbin 4 are driven to be displaced along the optical axis of the objective lens 2, that is, in the directions of arrow F in FIG. 3. When a current is supplied to the tracking coil 3b, the coil bobbin 4 and the magnetic field generating unit 9 are displaced in the directions indicated by the arrow T in FIG. 3, that is, perpendicular to the optical axis of the objective lens 2.

Similarly, the second magneto-optical pickup unit is displaced in the directions of arrows F and T synchronously with the displacement of the first optical pickup unit.

At the same time, high-frequency current signals obtained by amplifying signals to be recorded are supplied to the coil patterns 7 and 7' of the magnetic field generating units 9 and 9', which are made of the conductors 7a and 7a', so that magnetic fields are generated, respectively. These magnetic fields are obtained by high-speed reverse controls exercised in accordance with the recording signals, and are applied to the magnetic recording layers 12 and 12' of the double-sided magneto-optical recording medium 10. The laser beams emitted from the laser units 1 and 1' are focused on areas of the magnetic recording layers 12 and 12', where the magnetic fields are applied, through the objective lenses 2 and 2' and the light-transmitting optical glasses 8 and 8'. The temperatures of the magnetic recording layers 12 and 12' are raised over the Curie point to perform recording of the information signals. Specifically, the recording data is recorded by modulating a vertical magnetic field according to the supplied recording data.

As is apparent from the above description, the magneto-optical disc system in this embodiment is arranged such that the optical system comprising the pickup 6, 6' which has the laser unit 1, 1'; the objective lens 2, 2' and so forth, and the magnetic system comprising the magnetic field generating unit 9, 9', which is formed by providing the coil pattern 7, 7' in the optical glass 8, 8', are arranged on the same side with respect to the double-sided magneto-optical recording medium 10. Thus, the distance between the coil pattern 7, 7' and the magneto-optical recording medium 10 can be shortened. Since the thickness of the light-transmitting cover comprising the transparent protective plate 18 and the photo-curable resin layer 17 is small, around 0.8 mm, the distances between the coil pattern 7, 7' and the magneto-optical recording layer 12 of the magneto-optical recording medium 10 can be shortened, so that recording in the double-sided magneto-optical recording medium by means of the magneto-optical modulation scheme can be performed.

If the coil bobbin 4, 4' of the pickup 6, 6', and the magnetic field generating unit 9, 9', are stuck together, for example, by an adhesive or the like, the center of the objective lens 2, 2' is easily aligned with the center of the magnetic field of the magnetic field generating unit 9, 9'. Since the pickup 6, 6' is interlocked with the magnetic field generating unit 9, 9' by a focus servo, the intensity of the magnetic field applied to the double-sided magneto-optical recording medium 10 can always be made constant. A drive system for driving the magnetic system, which is required in a conventional case, can be omitted. Since the space of the magneto-optical pickup unit can be saved, freedom in design can be increased.

According to the second embodiment, recording in or reproduction from the double-sided optical recording medium 10 can be variously performed. For example, if the laser units 1 and 1' and the magnetic field generating units 9 and 9' are simultaneously used, simultaneous recordings in the respective upper and lower surfaces of the double-sided magneto-optical recording medium 10 can be performed. When both the laser units 1 and 1' are simultaneously used, simultaneous reproduction can be performed. A large storage capacity recording medium can be obtained, and high-speed recording and reproduction of information signals can be performed.

After recording in or reproduction from one surface of the double-sided magneto-optical recording medium 10 is performed, recording in or reproduction from the other surface can be performed. The capacity of recording and reproduction can be doubled as compared with that of a one-sided magneto-optical recording medium.

In the above case. When recording in one surface is being performed, it is possible to put both the magnetic field generating units 9 and 9' in action, and thereby apply two magnetic fields to one of the magnetic recording layers 12 from above and below the layer. Thus, the recording can be made in a stronger magnetic field.

Recording can be performed by using only one of the magnetic field generating units located near one side of the medium when the recording is being performed on the other side thereof.

The third embodiment will be described below. In this embodiment, the same magneto-optical disc system illustrated in FIG. 3 is used, in the embodiment of FIG. 5, but recording and reproduction can be performed on a second double-sided magneto-optical recording medium 30 shown in FIG. 5.

In the recording medium 30, a high-permeability layer 32, a photo-curable resin layer 33, a magneto-optical recording layer 34, an adhesive layer 35, and a transparent protective plate 36 are sequentially stacked on each of the surfaces of a single substrate 31. Both the transparent protective plate and the adhesive layer 35 have light-transmitting properties, and the transparent protective plate has a thickness of around 0.8 mm.

The high-permeability layer 32 is made of a transition metal such as Fe, Co, Ni or the like, or an alloy of the transition metals, such as Permalloy, Sendust, or an amorphous magnetic alloy. By using such a layer vertical magnetic field efficiency along the vertical direction of the double-sided magneto-optical recording medium 30 can be increased.

Figure 5:
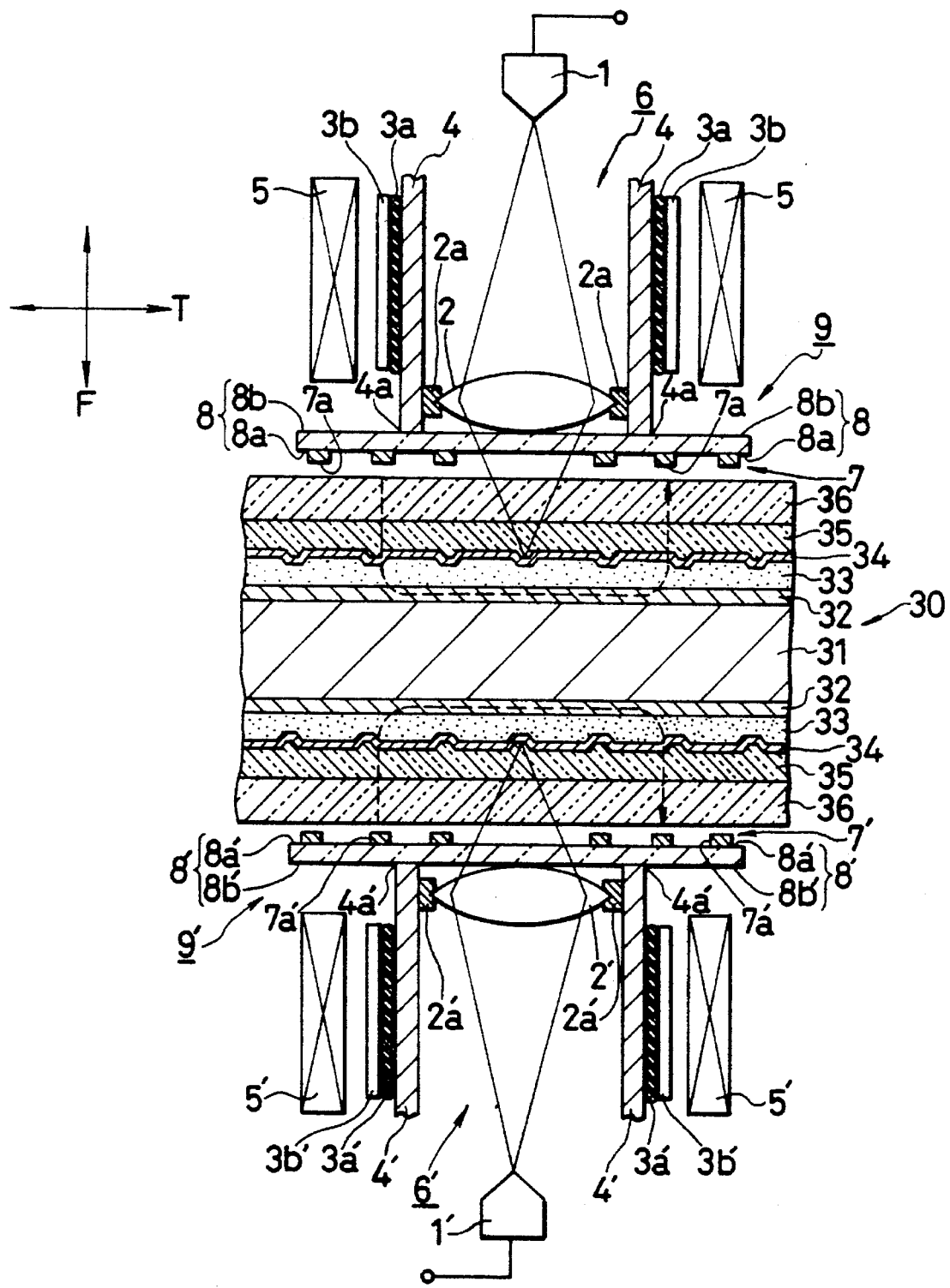
FIG. 5 is a sectional view showing the magneto-optical disc systems according to a third embodiment of the present invention.

In the third embodiment, the second double-sided magneto-optical recording medium 30 has the high-permeability layer 34, so that magnetic flux from the magnetic field generating units 9 and 9' forms a closed magnetic loop, as indicated by a broken line in FIG. 5, for example. In the recording mode, the magnetic flux applied to the double-sided magneto-optical recording medium 30 can thus be effectively bundled and preferably increase the vertical magnetic field efficiency.

Also in the third embodiment, recording in or reproduction from both surfaces of the double-sided magneto-optical recording medium 30 can be simultaneously performed. Further, as recording in or reproduction from one surface is performed, recording in or reproduction from the other surface can be performed.

As described above, in the second and third embodiments the numerical aperture NA of the objective lens 2, 2' is increased as embodied in the first embodiment, so that high-density recording and reproduction are possible. At the same time, the double-sided magneto-optical recording medium can be used, so that high storage capacity, higher-speed recording and reproduction are possible. Thus, a large storage capacity optical disc system can be proposed.

In the first to third embodiments, the magnetic field generating unit 9, 9' utilized the magnetic field modulation scheme, but another scheme such as an optical modulation scheme can be utilized by the magnetic field generating unit 9, 9'.

Although the present invention has been described hereinabove with reference to the preferred embodiments, it is to be understood that the invention is not limited to such illustrative embodiments alone, and various modifications may be contrived without departing from the spirit or essential characteristics thereof, which are to be determined solely from the appended claims.

What is claimed is:

1. A magneto-optical recording and/or reproducing apparatus using a magneto-optical recording medium having a light-transmitting cover layer capable of transmitting a light beam and a recording layer provided substantially parallel to one surface of the light-transmitting cover layer, the apparatus comprising:

a light source for generating a light beam; and an objective lens for converging the light beam radiated from the light source onto the recording layer through the light-transmitting cover layer, wherein the apparatus is characterized in that a minimum diameter ($2\omega_0$) of the convergent light beam when the light beam is converged by the objective lens is represented by:

$$2\omega_0 = 0.82\ \lambda/NA,$$

wherein the numerical aperture of the objective lens is 0.55 and the wavelength of the light beam generated from the light source is 680 nm.

2. A magneto-optical disc system for recording information signals and/or reproducing information signals comprising:

a magneto-optical recording medium having a light-transmitting cover layer capable of transmitting a light beam and a recording layer provided substantially parallel to one surface of the light-transmitting cover layer, the thickness of the light-transmitting cover layer of the optical disc being substantially equal to 0.8 mm;

a light source for generating a light beam; and an objective lens for converging the light beam radiated from the light source onto the recording layer through the light-transmitting cover layer, wherein the system is characterized in that a minimum diameter ($2\omega_0$) of the convergent light beam when the light beam is converged by the objective lens is represented by:

$$2\omega_0 = 0.82\ \lambda/NA,$$

wherein the numerical aperture NA of the objective lens is 0.55, and the wavelength $\lambda$ of the light beam generated from the light source is 680 nm.

* * * * *